(12) United States Patent
Fukawatase et al.

(10) Patent No.: US 8,393,639 B2
(45) Date of Patent: Mar. 12, 2013

(54) INFLATOR AND VEHICLE AIRBAG DEVICE USING THE SAME

(75) Inventors: Osamu Fukawatase, Aichi (JP); Yasushi Itou, Toyota (JP); Takaki Fukuyama, Kiyosu (JP); Hiroki Murase, Kiyosu (JP); Naoki Matsuda, Tatsuno (JP); Tomoharu Kobayashi, Tatsuno (JP)

(73) Assignees: Toyota Jidosha Kabushiki Kaisha, Toyota (JP); Toyoda Gosei co., Ltd., Kiyosu-Shi (JP); Daicel Chemical Industries, Ltd., Osaka-Shi (JP)

( * ) Notice: Subject to any disclaimer, the term of this patent is extended or adjusted under 35 U.S.C. 154(b) by 229 days.

(21) Appl. No.: 12/672,781

(22) PCT Filed: Aug. 8, 2008

(86) PCT No.: PCT/JP2008/064324
§ 371 (c)(1),
(2), (4) Date: Jul. 29, 2010

(87) PCT Pub. No.: WO2009/020209
PCT Pub. Date: Feb. 12, 2009

(65) Prior Publication Data
US 2011/0025025 A1    Feb. 3, 2011

(30) Foreign Application Priority Data

Aug. 9, 2007    (JP) ................................. 2007-208560

(51) Int. Cl.
*B60R 21/26*    (2011.01)
*C06D 5/00*    (2006.01)
(52) U.S. Cl. .......................... 280/736; 280/741; 102/530
(58) Field of Classification Search .................. 280/736, 280/731, 741; 102/530
See application file for complete search history.

(56) References Cited

U.S. PATENT DOCUMENTS 5,054,811 A * 10/1991 Unterforsthuber et al. ... 280/742
5,527,067 A *  6/1996 Iwai et al. ..................... 280/741

(Continued)

FOREIGN PATENT DOCUMENTS

DE    44 15 523    11/1995
DE    100 18 915    10/2001

(Continued)

OTHER PUBLICATIONS

Notification of the First Office Action for Chinese Appl. No. 200880102698.0 dated Jul. 25, 2011.

(Continued)

*Primary Examiner* — Paul N Dickson
*Assistant Examiner* — Karen Beck
(74) *Attorney, Agent, or Firm* — Oliff & Berridge, PLC

(57) ABSTRACT

A disc inflator having gas cooling and mist removal functions, and reduced in weight and in size in a radial direction. An inflator case (40) has an upper case (36) at an occupant side and a lower case (38) at a side opposite an occupant. A tubular holding member (60) having a separation wall (64) at a base portion thereof is provided in the inflator case. A gas flow path (74) is formed at a periphery of the holding member (60), and communication holes (80) communicating with the gas flow path (74) are formed in the separation wall (64). At a peripheral wall portion (36B) of the upper case (36) is formed a gas ejection hole (76) at a position offset towards an occupant side only by a distance δ from a central position P of a combustion chamber (68). Accordingly, a length (L1) of a flow path from the starting end of the flow path to the gas ejection hole (76) increases, enabling effective heat exchange of a high temperature gas and removal of mist (82). Thereby, a conventionally used filter may be disposed of.

12 Claims, 9 Drawing Sheets

U.S. PATENT DOCUMENTS

| | | | |
|---|---|---|---|
| 5,588,676 A * | 12/1996 | Clark et al. | 280/741 |
| 5,624,134 A * | 4/1997 | Iwai et al. | 280/741 |
| 5,829,784 A * | 11/1998 | Brown et al. | 280/737 |
| 5,851,027 A * | 12/1998 | DiGiacomo et al. | 280/736 |
| 5,863,066 A | 1/1999 | Blumenthal | |
| 5,984,352 A * | 11/1999 | Green et al. | 280/736 |
| 6,007,098 A | 12/1999 | Olson et al. | |
| 6,227,565 B1 * | 5/2001 | McFarland et al. | 280/736 |
| 7,178,830 B2 | 2/2007 | Blackburn | |
| 7,237,801 B2 * | 7/2007 | Quioc et al. | 280/736 |
| 2005/0082804 A1 * | 4/2005 | Khandhadia | 280/736 |
| 2006/0113780 A1 * | 6/2006 | Goetz | 280/736 |
| 2007/0284863 A1 * | 12/2007 | Bostick et al. | 280/741 |
| 2008/0150260 A1 * | 6/2008 | Whang et al. | 280/728.1 |
| 2009/0058055 A1 * | 3/2009 | Fujimori et al. | 280/731 |
| 2011/0025025 A1 * | 2/2011 | Fukawatase et al. | 280/728.3 |
| 2011/0100247 A1 * | 5/2011 | Fukuyama et al. | 102/530 |
| 2011/0221175 A1 * | 9/2011 | Kobayashi et al. | 280/741 |
| 2011/0241323 A1 * | 10/2011 | Naganawa et al. | 280/731 |
| 2012/0090493 A1 * | 4/2012 | Fukuyama et al. | 102/530 |

FOREIGN PATENT DOCUMENTS

| | | |
|---|---|---|
| JP | 3015759 | 6/1995 |
| JP | 2001-500451 | 1/2001 |
| JP | 2001-341610 | 12/2001 |
| JP | 2006-76558 | 3/2006 |
| JP | 3122258 | 5/2006 |
| JP | 3122259 | 5/2006 |
| JP | 2007-508979 | 4/2007 |

OTHER PUBLICATIONS

"Notice of Reasons for Rejection" in Japanese Application No. 2007-208560 filed Aug. 9, 2007 (Mailing date: Nov. 4, 2008).

German Office Action for German Appl. No. 11 2008 002 151.1-21 dated Apr. 4, 2011.

* cited by examiner

INFLATOR AND VEHICLE AIRBAG DEVICE USING THE SAME

CROSS-REFERENCE TO RELATED APPLICATIONS

This application is a national phase application of International Application No. PCT/JP2008/064324, filed Aug. 8, 2008, and claims the priority of Japanese Application No. 2007-208560, filed Aug. 9, 2007, the contents of both of which are incorporated herein by reference.

TECHNICAL FIELD

The present invention relates to a disc inflator that generates gas by operation thereof, and a vehicle airbag device using the same.

BACKGROUND ART

Japanese Patent Application Laid-Open (JP-A) No. 2006-76558 discloses a flat cylindrical disc inflator mounted to a driver's seat airbag device. In this type of disc inflator, due to the operation of a squib (ignition device) disposed at an axial core portion, a gas generating agent filled at an outer peripheral portion of the squib combusts, and a large amount of gas is generated. The generated gas is ejected from plural gas ejection holes formed in a peripheral wall portion of an upper case, and flows into an airbag which is in a folded state.

Conventionally, in an inflator in which a gas generating agent combusts and gas is generated, in order to remove combustion residue created when the gas generating agent combusts (hereinafter also referred to as "mist"), and to cool a high temperature gas, a coolant filter wrapped in a ring shape is disposed at an inner peripheral portion of the upper case. As a result various problems have arisen, such as the need to enlarge the inflator in a radial direction, and to increase the weight of the inflator.

In order to address these issues, an inflator having a filter-less structure in which a coolant filter is not used has been developed (see Japanese Utility Model Registration No. 3122258 and Japanese Utility Model Registration No. 3122259). A brief explanation of this technology is that, a gas generating agent is filled into a combustion chamber of an inflator, and a flow forming member that forms a gas flow path that is L-shaped in a longitudinal section is provided concentrically at an outer peripheral portion of the gas generating agent. According to this configuration, when the direction in which gas flows is changed, mist of the gas generating agent adheres to a wall surface and is removed, and the gas that flows into the airbag is also cooled.

Patent Document 1: Japanese Patent Application Laid-Open (JP-A) No. 2006-76558
Patent Document 2: Japanese Utility Model Registration No. 3122258
Patent Document 3: Japanese Utility Model Registration No. 3122259
Patent Document 4: JP-A No. 2001-341610 (see FIGS. 1 and 5, and paragraph [0064])
Patent Document 5: JP-A No. 2007-508979

DESCRIPTION OF THE INVENTION

Problem to be Solved by the Invention

However, in the techniques disclosed by Japanese Utility Model Registration No. 3122258 and Japanese Utility Model Registration No. 3122259, in order to reduce gas temperature and remove mist, new parts are necessary such as a gas flow path forming member or the like. As a result, when a gas flow path forming member is disposed concentrically, an inflator increases in size in a radial direction, and the weight of the inflator also increases by the weight of the installed gas flow path forming member. Therefore, this prior art does not sufficiently address the issue of reducing the weight of an inflator and reducing the size thereof in a radial direction, and there is room for further improvement of the above inflator.

JP-A No. 2001-341610 (see FIGS. 1 and 5, and paragraph [0064]) discloses a cylindrical inflator used for a passenger seat airbag device. In this inflator, a gas generation device housing formed as a long thin cylinder is provided at an axial core portion of a cylindrical inflator housing. A gas generating agent is filled at an inner peripheral side of the gas generation device housing, and when the gas generating agent combusts, gas flows from the gas generation device housing, through plural communication holes formed in a peripheral wall of the gas generation device, flows against an inner peripheral surface of the inflator housing, and is ejected towards an outside portion of the inflator. According to this inflator, gas may be cooled and mist may be removed; however, since the inflator is originally meant to be used with a passenger seat airbag device, it is long in an axial direction. Thus, it has been difficult to apply this configuration for a disc inflator which is inherently short in an axial direction.

The present invention considers the above facts, and takes as an object to obtain a disc inflator that ensures gas cooling and mist removing functions, while reducing the weight of an inflator and the size thereof in a radial direction, and a vehicle airbag device that uses the inflator.

Means for Solving the Problem

A first embodiment of the present invention is an inflator including: an inflator case including a pair of base wall portions that close end portions in an axial direction of a peripheral wall portion in which a gas ejection hole is formed; a ignition device disposed at an inner portion of the inflator case; a holding member disposed at an inner portion of the inflator case, that accommodates and holds a gas generating agent that generates gas as a result of being ignited by the ignition device and combusting; a gas flow path formed at an inner side of the inflator case and at a periphery of the holding member, such that a combustion chamber defined by at least the holding member is communicated with the gas ejection hole, in which the gas ejection hole is offset in an axial direction of the inflator case, with respect to a central position of the combustion chamber in an axial direction of the inflator case, and a separation wall that forms a part of the holding member and that is provided with a communication hole that communicates the combustion chamber with the gas flow path, is disposed at least at a side opposite a side of the holding member in an inflator case axial direction at which the gas ejection hole is disposed, such that the inflator does not use a filter.

In a second embodiment, the separation wall is disposed at a side of the holding member opposite a side in an inflator case axial direction at which the gas ejection hole is formed, and the separation wall is not disposed at a side of the holding member in an axial direction of the inflator case at which the gas ejection hole is formed, said side being in an open state, and being closed by the base wall portion of the inflator case.

A third embodiment includes an inflator case including a pair of base wall portions that close end portions in an axial direction of a peripheral wall portion in which a gas ejection hole is formed; a ignition device disposed at an inner portion of the inflator case; a holding member disposed at an inner portion of the inflator case, that accommodates and holds a gas generating agent that generates gas as a result of being ignited by the ignition device and combusting; and a gas flow path formed at an inner side of the inflator case and at a periphery of the holding member, such that a combustion chamber defined by at least the holding member is communicated with the gas ejection hole, in which, the gas ejection hole is disposed in the combustion chamber at a central position in an axial direction of the inflator case; and at both end portions of the holding member in an axial direction of the inflator case, respective separation walls that form part of the holding member are formed each provided with communication holes that communicate the combustion chamber with the gas flow path, such that the inflator does not use a filter.

In a fourth embodiment, the communication hole is formed inclined away from the gas ejection hole with respect to a plate thickness direction that passes through the communication hole.

In a fifth embodiment, at an inner side surface of a base wall portion that opposes the separation wall of the inflator case, plural projections, or plural recessions, or both plural recessions and plural projections, are formed, in order to generate turbulence in a gas flow.

A vehicle airbag device according to the sixth embodiment includes: the inflator of any one of the first to the fifth embodiments; a base member that is attached to and supports the inflator; an airbag fixed to the base member in a folded state, and that expands upon being supplied with gas from the inflator, and an airbag cover that stores the airbag in a folded state between the airbag cover and the base member, and that opens an airbag door and expands the airbag when a bag expansion pressure reaches a predetermined value.

According to the first embodiment, a holding member is mounted at an inner portion of an inflator case, and the holding member accommodates and holds a gas generating agent. When an ignition device operates and combusts the gas generating member, a large amount of gas is generated in the combustion chamber. The generated gas passes through a gas flow path formed at an inner surface of an inflator case and at a periphery of a holding member, and is ejected towards an outside portion of the inflator from an ejection hole formed in a peripheral wall portion of the inflator case.

Thus, in the present embodiment, since a gas ejection hole is offset in an axial direction of the inflator case with respect to a central position of the combustion chamber in an axial direction of the inflator case, and a separation wall that forms a part of the holding member and that is provided with communication holes that communicate the combustion chamber with the gas flow path, is formed at least at a side opposite a side of the holding member in an inflator case axial direction at which the gas ejection hole is formed, is provided, the length of a gas flow path from a communication hole to a gas ejection hole can be increased. As a result, heat exchange between a high temperature gas generated at the combustion chamber and an inflator case is promoted, and the gas can be effectively cooled. Further, mist included in the gas meets flow resistance when passing through the gas flow path, and adheres to an inner side surface of the inflator. In other words, it is possible to obtain a flow path length of a gas flow path sufficient for mist to adhere to an inner side surface of an inflator case. Thus, mist included in the gas can also be effectively removed before the gas reaches the gas ejection hole.

As described above, in the embodiment, gas cooling and mist removal may be performed without providing any new parts in particular. That is, it is possible for the function of a conventionally used filter wrapped in a ring to be performed by another part, and as a result it is possible to dispose of a filter.

A premise of the second embodiment is a that a gas ejection hole is offset in an axial direction of the inflator case, with respect to a central position of the combustion chamber in an axial direction of the inflator case, and moreover, the separation wall is only disposed at a side of the holding member opposite a side in an inflator case axial direction at which the gas ejection hole is formed, and the separation wall is not disposed at a side of the holding member in an axial direction of the inflator case at which the gas ejection hole is formed, said side being in an open state, and being closed by the inflator case. Thereby, compared to a case in which separation walls are provided at both ends in an inflator case axial direction of a holding member, assuming that an accommodation volume of a gas generating agent is not changed, it is possible to reduce the size of an inflator in an axial direction by an amount corresponding to the thickness of one separation wall. Conversely, if the axial direction dimensions of an inflator are not to be changed, the accommodation volume (that is, a gas supply amount) of a gas generating agent can be increased.

The third embodiment includes a holding member mounted at an inner portion of the inflator case, that accommodates and holds a gas generating agent that generates gas as a result of being ignited by the ignition device and combusting. The generated gas flows through a gas flow path formed at an inner side of the inflator case and at a peripheral portion of the holding member, and is ejected to an outer portion of the inflator from a gas ejection hole formed in a peripheral wall portion of the inflator case.

In the present embodiment, the gas ejection hole is disposed in the combustion chamber at a central position in an axial direction of the inflator case, and at both end portions of the holding member in an axial direction of the inflator case, respective separation walls that form part of the holding member are formed each provided with communication holes that communicate the combustion chamber with the gas flow path, thereby forming a system of two gas flow paths which are substantially equal in length from respective communication holes to the gas ejection hole.

As a result, when considering only the lengths of each gas flow path, even though the lengths of each gas flow path in the present embodiment are shorter than that of an embodiment in which a gas ejection hole is offset; however, when the length of a combustion chamber in an inflator case axial direction is comparatively larger, each gas flow path of the system of two gas flow paths has an effective cooling surface and mist removal surface, and therefore heat exchange is promoted between the inflator case and a high temperature gas generated in the combustion chamber, and the gas can be effectively cooled thereby. Further, mist included in the gas encounters flow resistance when passing though each gas flow path, and adheres to an inner side surface of the inflator case. In other words, it is possible to obtain a flow path length of a gas flow path sufficient for mist to adhere to an inner side surface of an inflator case. Consequently, mist included in the gas may also be effectively removed by a system of two gas flow paths before gas from a communication hole reaches a gas ejection hole.

According to the above, in the present embodiment, gas can be cooled and mist can be removed from the gas without the addition of any new parts in particular. That is, since the function of a conventionally used filter wrapped in a ring can be performed by another part, the filter can be disposed of.

In the fourth embodiment, since the communication hole is formed inclined away from the gas ejection hole with respect to a plate thickness direction that passes through the communication hole, gas in the gas flow path first flows (is deflected) away from a gas ejection hole, and then flows around a peripheral wall portion side of the inflator case. Therefore, although the length of the gas flow path itself does not change, the length of the path through which gas flows increases in practice.

In a fifth embodiment, since at an inner side surface of a base wall portion that opposes the separation wall of the inflator case, plural recessions, or plural projections, or both plural recessions and plural projections, are formed, turbulence is generated. Thereby, the amount of time that gas remains (a heat exchange time) at a position at which the recession or the like is formed increases, and the amount of time over which the gas undergoes flow resistance at the inflator case increases. Further, as a result of the turbulence, a contact area between the gas and the inflator case also increases. As a result, gas cooling can be promoted, and mist can further adhere to an inner side surface of the inflator case.

According to the sixth embodiment, when an ignition device operates, gas is generated by the inflator, and gas flows to the inside of an airbag which is attached to a base member in a folded state. As a result the airbag expands and a predetermined bag expansion pressure is applied to an inner side surface of an airbag cover. When the bag expansion pressure reaches a predetermined value, an airbag door provided at the airbag cover opens and the airbag is expanded outwards.

This embodiment may use any of the inflators of the first to fifth embodiments, and thereby a vehicle airbag device reduced in size and weight may be obtained. For example, if the vehicle airbag device is a driver's side vehicle airbag device, since a driver's side airbag is mounted in a wheel pad of a steering wheel, there is little mounting space in a radial direction and in an axial direction of the steering wheel. In a case such as this, by using the present embodiment, since an inflator can be used in which at least the size in a radial direction thereof, and the weight thereof are reduced, a driver's seat airbag device can be made lighter and more compact.

Effects of the Invention

As explained above, the inflator according to the first embodiment can ensure gas cooling and mist removal functions in a disc inflator, and has the exceptional effect of a reduction in the size of an inflator in a radial direction and a reduction in the weight thereof.

The inflator according to the second embodiment has the exceptional effect of a reduction in the size of an inflator in both of a radial direction and an axial direction, assuming that a gas generating agent accommodation volume is unchanged. Further, if the length in an axial direction of the inflator is to remain unchanged, the exceptional effect of increasing a gas supply amount in an inflator, without changing the size of the inflator, can be achieved.

The inflator according to the third embodiment, similar to the first embodiment, has the exceptional effect of ensuring gas cooling and mist removal functions in a disc inflator, and also has the exceptional effect of reducing the size of an inflator in a radial direction and reducing the weight thereof.

Since, in the inflator according to the fourth embodiment, a gas flow length can be increased in practice, the fourth embodiment has the exceptional effect of improved gas cooling and mist removal functions.

The fifth embodiment has the exceptional effects of further cooling a gas, and further removing mist included in the gas.

The vehicle airbag device according to the sixth embodiment has the exceptional effect of reducing the overall size and weight of an airbag device.

BEST MODE FOR IMPLEMENTING THE INVENTION

First Embodiment

A first embodiment of an inflator according to the present invention, and a vehicle airbag device provided with the inflator, is explained below with reference to FIGS. 1-5. Arrow X shown in these figures indicates an occupant side direction, and arrow Y indicates a direction opposite to the occupant side direction.

Figure 3:
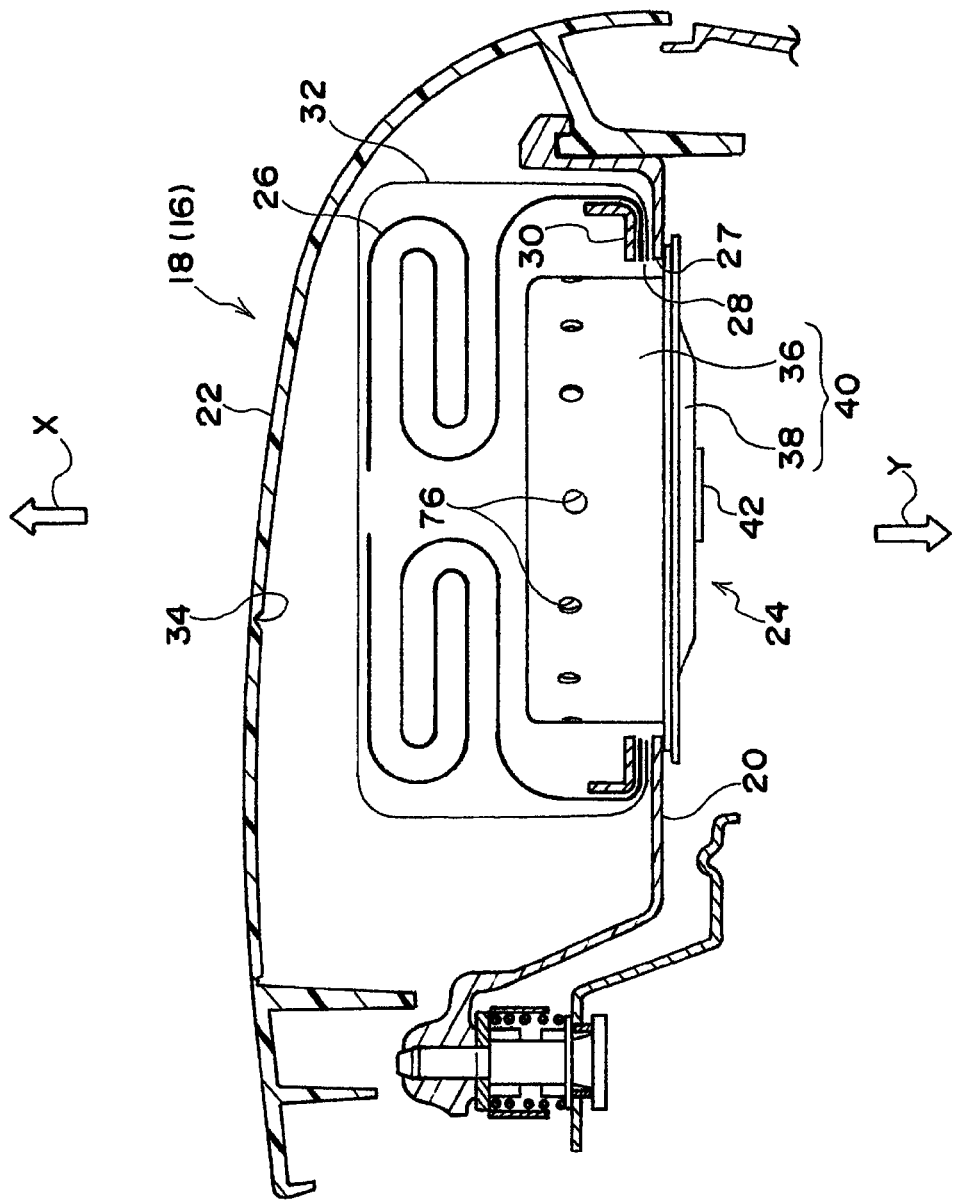
FIG. 3 is a schematic longitudinal section (along the line 3-3 of FIG. 4) of a driver's seat airbag device provided with the inflator shown in FIG. 1.
Figure 4:
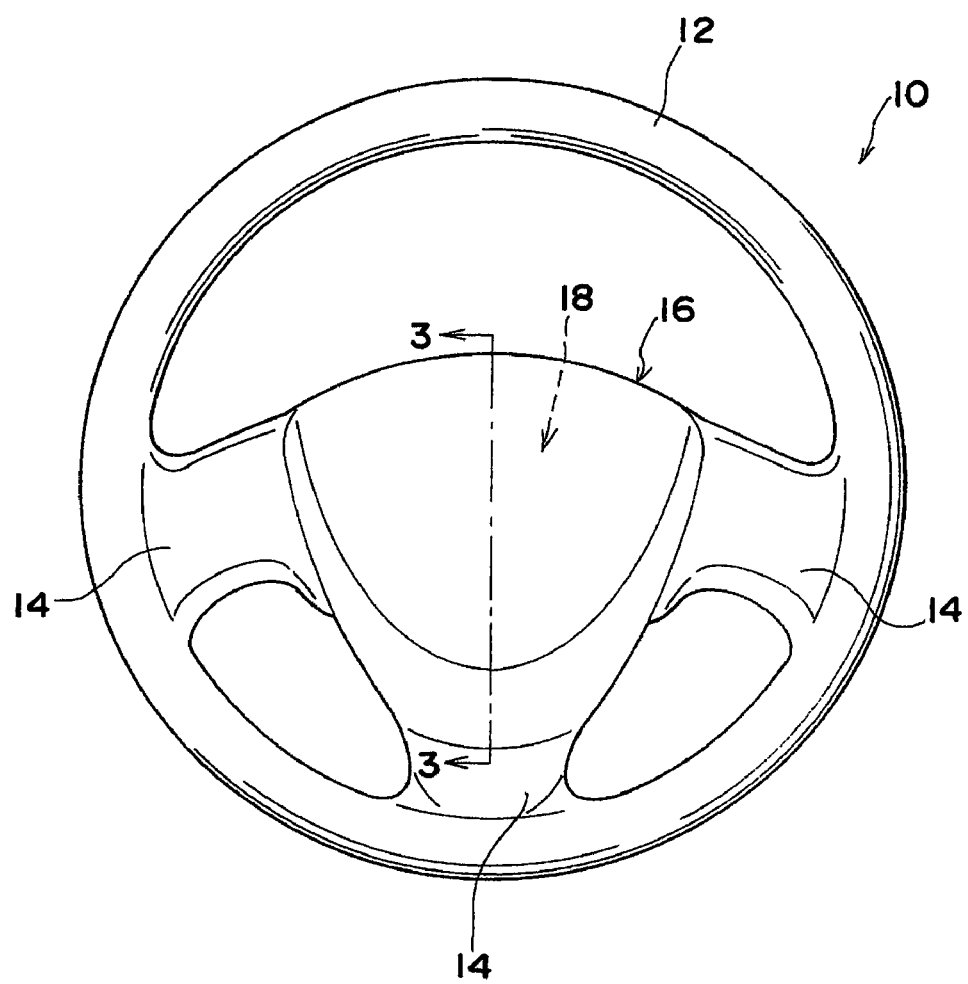
FIG. 4 is a front view of a steering wheel provided with the driver's seat airbag device shown in FIG. 3.

FIG. 4 is a front view of a steering wheel provided with a driver's seat airbag device as a vehicle airbag device. FIG. 3 is longitudinal section (along the line 3-3 of FIG. 4) of a driver's seat airbag device. As shown in these figures, steering wheel 10 is a 3-spoke steering wheel, including a circular rim portion 12, a hub (not shown) disposed at a core portion of rim portion 12, three spokes 14 that connect rim portion 12 to the hub, and a wheel pad 16 disposed at a center portion of rim portion 12.

A driver's seat airbag device 18 is disposed in wheel pad 16. As shown in FIG. 3, driver's seat airbag device 18 includes as main portions, schematically, a base plate 20 as a base portion supported by a hub (not shown), an airbag door 22 provided opposing base plate 20 and formed as a part of wheel pad 16, an inflator 24 inserted from a side opposite an occupant into an circular insertion hole 27 formed in a center portion of base plate 20, and an airbag 26 accommodated in a folded state between base plate 20 and airbag door 22.

Base plate 20 is configured with a metal material having high strength. An upper case 36 of a inflator case 40, both described below, of inflator 24 is inserted from a side opposite an occupant into an circular insertion hole 27 formed in base plate 20, and an attachment portion 36D of upper case 36, also described below (see FIG. 2), is fixed to base plate 20 by a bolt and nut (not shown). At an inner side of an opening portion 28 of airbag 26 is provided a ring plate 30 (the broad meaning of which is an element that serves as an airbag fixing member). Plural bolts (not shown) project from ring plate 30 towards a side opposite an occupant, and pass through a peripheral edge portion of opening portion 28 of airbag 26, and through a peripheral edge portion of insertion hole 27 of base plate 20. The plural bolts are attached to nuts (not shown) by screwing from a side opposite an occupant of base plate 20, and opening portion 28 of airbag 26 is thereby fixed and held between ring plate 30 and base plate 20. Opening portion 28 of airbag 26 is provided at a periphery of insertion hole 27 of base plate 20. Attachment portion 36D, described below, of upper case 36 of inflator 24 is disposed at a side opposite an occupant of insertion hole 27. Opening portion 28 of airbag 26, and attachment portion 36D of upper case 36 of inflator 24, may be attached together to base plate 20 by a nut and a bolt projecting from ring plate 30.

Airbag 26 is covered with a protective textile 32 that maintains a specific folded state thereof, until an attachment operation of driver's seat airbag device 18 itself has been completed. At a back surface of wheel pad 16 (a surface at a side opposite an occupant), is formed a breaking portion 34 configured to be a substantially "H" shaped thin portion, or the like, by which airbag door 22 may open in a vertical direction.

The structure of inflator 24, which is a main portion of the present embodiment, is described below in detail with reference to FIGS. 1 and 2.

Figure 1:
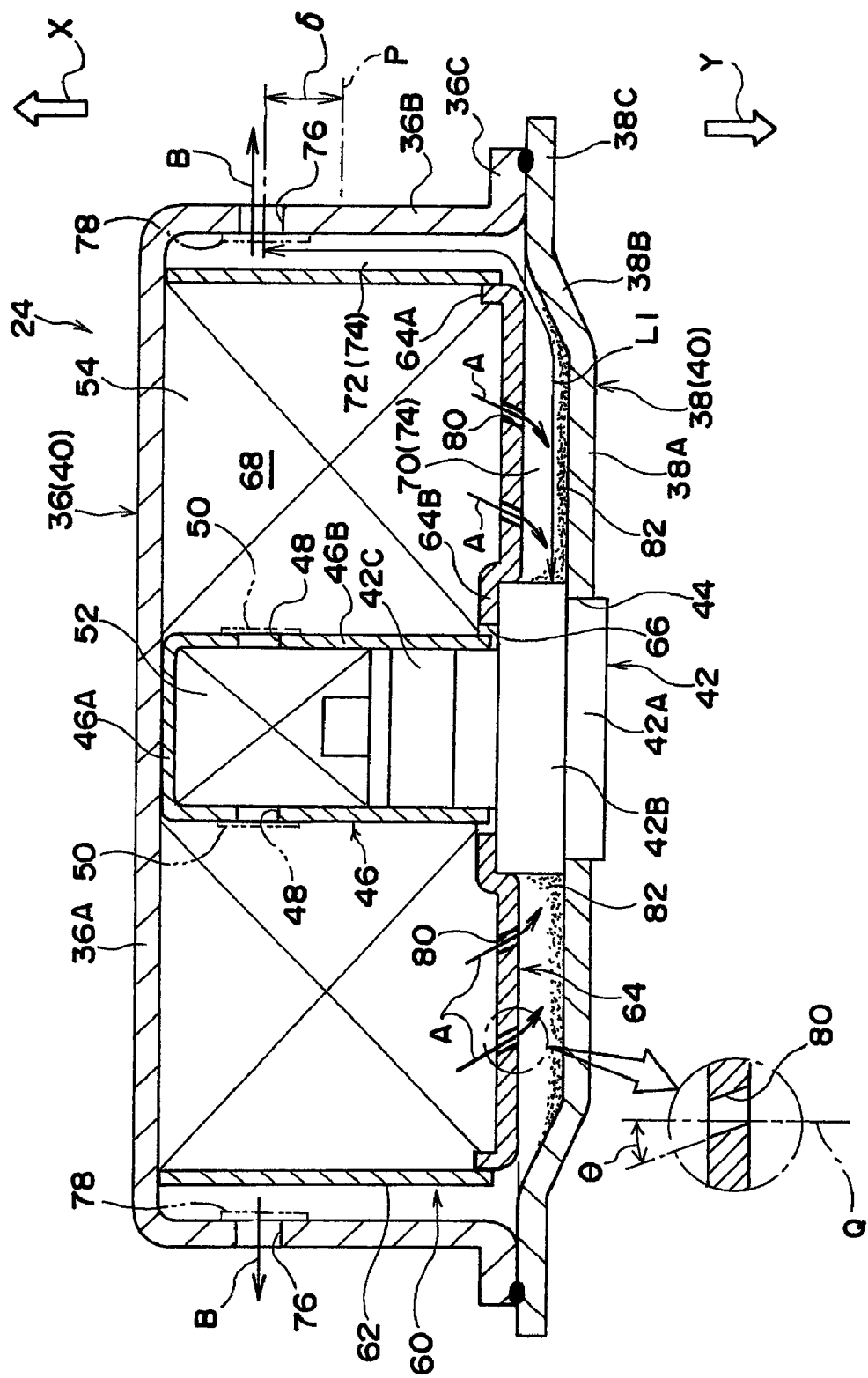
FIG. 1 is an enlarged longitudinal section showing an inflator according to the first embodiment.
Figure 2:
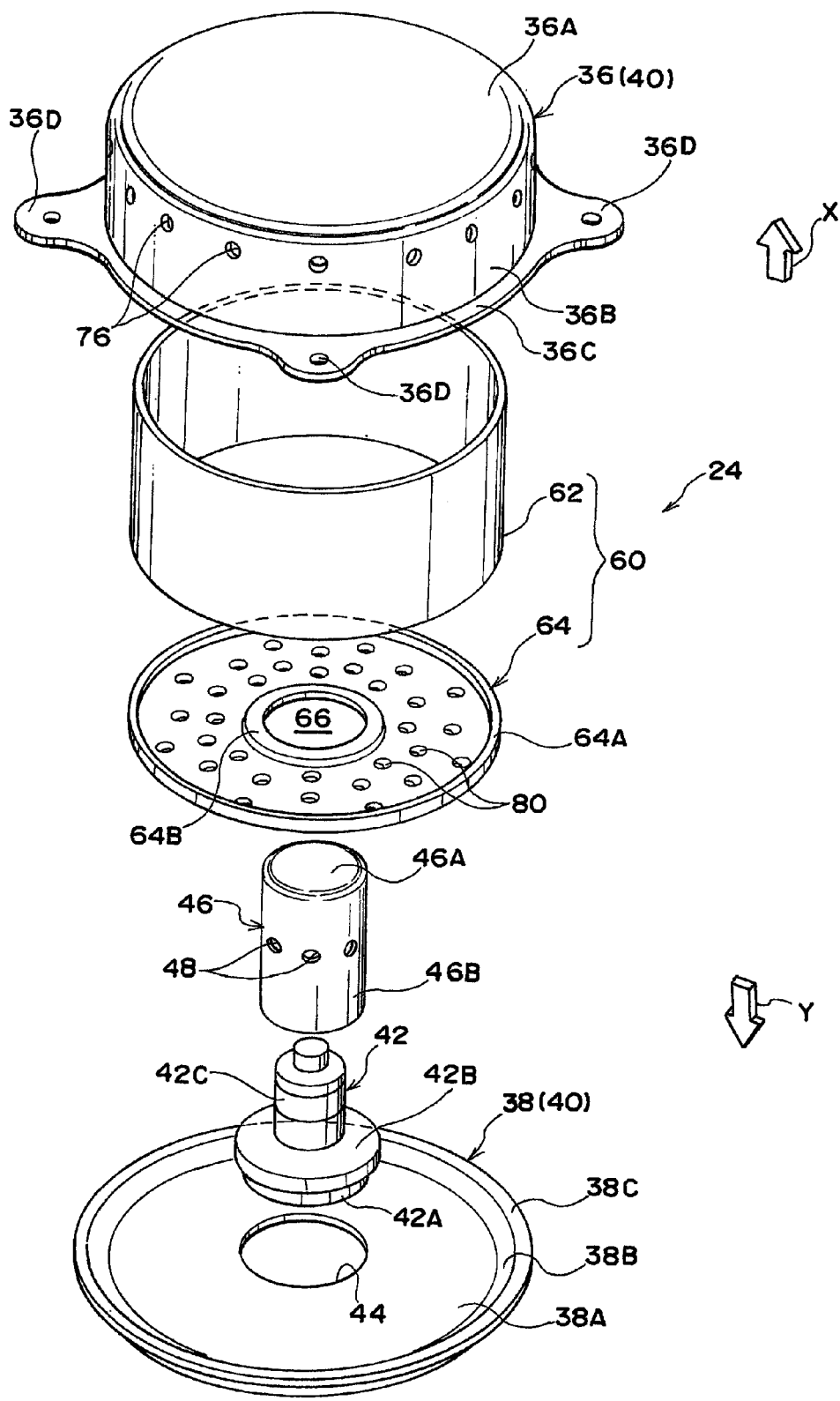
FIG. 2 is an exploded perspective view of the inflator shown in FIG. 1 (omitting a gas generating agent).

FIG. 1 is an enlarged longitudinal section of inflator 24 shown in FIG. 3. FIG. 2 is an exploded perspective view of the inflator 24 (omitting gas generating agents 52 and 54 described below).

As shown in these figures, inflator 24, when attached, includes a metal inflator case 40 having an upper case 36 disposed at an occupant side and a lower case 38 disposed at a side opposite an occupant. Upper case 36 is formed as a deep cylinder. Upper case 36 includes a base wall portion 36A disposed at an occupant side when attached, a peripheral wall portion 36B that projects from a peripheral edge portion of base wall portion 36A towards a side opposite an occupant, a flange portion 36C that bends from a side opposite an occupant of peripheral wall portion 36B towards a radial direction outer side, and an attachment portion 36D that extends from four positions in a peripheral direction of flange portion 36C towards a radial direction outer side (see FIG. 2). Lower case 38 has a shallow dish shape, and includes a base wall portion 38A disposed parallel to and opposing base wall portion 36A of upper case 36, and a flange portion 38C that extends from base wall portion 38A across an inclined portion 38B towards a radial direction outer side. Flange portion 36C of upper case 36 contacts flange portion 38C of lower case 38, and flange portion 36C and flange portion 38C are welded together. Thereby, upper case 36 and lower case 38 are integrated, and inflator case 40 is formed.

At an axial core portion of the above described inflator case 40 is provided a squib (ignition device) 42. Squib 42 has substantially a cylindrical shape, and includes a circular plate shaped mounting portion 42A at an end at a side opposite an occupant thereof, a base portion 42B having a diameter larger than that of mounting portion 42A, and a ignition portion 42C that has a small diameter and that projects from an axial core portion of base portion 42B towards an occupant side. Mounting portion 42A may fit into a circular insertion hole 44 formed in an axial core portion of lower case 38, such that squib 42 may be mounted at an axial core portion of lower case 38 at a specific position. Squib 42 is connected to an airbag ECU (not shown), and based on a detection signal from an airbag sensor (not shown), the airbag ECU determines whether or not to operate driver's seat airbag device 18. When the airbag ECU determines that driver's seat airbag device 18 should be operated, a predetermined electric current is sent to squib 42.

The axial length of squib 42 is approximately half the axial length of inflator case 40, and a metal cylindrical retainer 46 having a base is fitted around an outer peripheral portion of ignition portion 42C. Base portion 46A of retainer 46 contacts base wall portion 36A of upper case 36. Plural communication holes 48 are formed at a predetermined spacing around a peripheral direction of peripheral wall portion 46B of retainer 46. Further, a seal 50 is tightly attached at an outer peripheral surface of communication holes 48, such that seal 50 breaks when the internal pressure of retainer 46 reaches a predetermined value or greater. At an inner portion of retainer 46 is filled a gas generating agent 52 which is described below and configured identically to gas generating agent 54, which is also described below, and gas generating agent 52 serves as an enhancer that spreads a flame to gas generating agent 54.

In inflator case 40 is provided a metal holding member 60 which has a tubular shape, and is sealed at one end portion thereof in an axial direction. Holding member 60 includes a peripheral wall portion 62 having an outer diameter smaller than the inner diameter of upper case 36 and a cylindrical separation wall 64 that seals peripheral wall portion 62 at an opening portion thereof at a side opposite an occupant.

A peripheral edge portion 64A of separation wall 64 projects in a circular manner towards an occupant side, and is inserted at an inner side of an end portion of the opening of peripheral wall portion 36B at a side opposite an occupant and fixed thereat. At a axial core portion of separation wall 64 is formed a circular protrusion portion 64B, and an attachment hole 66 is formed at an axial core portion of protrusion portion 64B. Ignition portion 42C of squib 42 is inserted from a side opposite an occupant into attachment hole 66, such that base portion 42B is mounted to (fits into) protrusion portion 64B. Holding member 60 to which squib 42 is mounted is inserted into upper case 36, and when mounting portion 42A of squib 42 is fitted to insertion hole 44 of lower case 38, an occupant side end portion of peripheral wall portion 36B of holding member 60 contacts a surface at a side opposite an occupant of base wall portion 36A of upper case 36. The dimensions of each portion are set according to squib 42 such that holding member 60 does not move from a predetermined position.

When holding member 60 is in a mounted state, a circular space formed between holding member 60 and retainer 46 is combustion chamber 68. Gas generating agent 54 is filled into combustion chamber 68 and maintained thereat. In the present embodiment, combustion chamber 68 is delineated by an inner surface of base wall portion 36A of upper case 36, (separation wall 64 and peripheral wall portion 62 of) holding member 60, and peripheral wall portion 46B of retainer 46.

When holding member 60 is mounted, a circular plate-shaped space (first flow path 70) is formed between separation wall 64 of holding member 60 and base wall portion 38A of lower case 38. Further, between peripheral wall portion 62 of holding member 60 and peripheral wall portion 36B of upper case 36 is formed a circular space (second flow path 72). First flow path 70 and second flow path 72 are connected together at a position at which inclined portion 38B of lower case 38 is formed, to form gas flow path 74. The flow length of gas flow path 74 (the length from a starting end of the flow path to gas ejection hole 76) is L1 (see FIG. 1). At positions of peripheral wall portion 36B of upper case 36 at which it contacts second flow path 72, are formed plural gas ejection holes 76 at a predetermined spacing around a peripheral direction of upper case 36. Gas ejection holes 76 are sealed by seal 78.

Gas ejection hole 76 of upper case 36 is formed at a position offset towards an occupant side by a distance δ with respect to an axial direction central position (dot-dash line P in FIG. 1) of combustion chamber 68 of inflator 24. Plural communication holes 80 that communicate with first flow path 70 and combustion chamber 68 are formed in separation wall 64 of holding member 60. In other words, communication holes 80 are formed in separation wall 64 at a side opposite the side (the offset side) at which gas ejection hole 76 of holding member 60 is positioned. Each of communication holes 80 are inclined in a direction away from gas ejection hole 76 by an angle θ with respect to a plate thickness direction (dot-dash line Q in FIG. 1) that passes through communication holes 80.

Gas ejection hole 76 is formed at a position offset towards an occupant side by a distance δ with respect to an axial direction central position (dot-dash line P) of combustion chamber 68, so that, when inflator 24 is inserted into insertion hole 27 of base plate 20 from a side opposite an occupant, and opening portion 28 of airbag 26 is sandwiched at ring plate 30 and base plate 20 is fixed, a member such as ring plate 30 is not present in a gas ejection direction (not present at an outer side in a radial direction that passes through gas ejection hole 76); that, is in order to avoid interference between gas and a member.

Operations and Effects of the Present Embodiment

The operations and effects of the present embodiment are explained below.

In a frontal impact, a frontal impact is detected by an airbag sensor (not shown), and a detection signal is output to an airbag ECU. At the airbag ECU, it is determined whether driver's seat airbag device 18 should be operated, and if it is determined that driver's seat airbag device 18 should be operated, a predetermined electric current is sent to squib 42. As a result, gas generating agent 52 disposed directly above squib 42 combusts, and the internal pressure of retainer 46 increases. When the internal pressure of retainer 46 reaches a predetermined value, seal 50 that seals communication holes 48 breaks, and a flame spreads to combustion chamber 68. Consequently, gas generating agent 54 that fills holding member 60 combusts, and a large amount of high temperature gas including mist 82 is generated (see FIG. 1). The high temperature gas including mist 82 generated in combustion chamber 68 passes through plural communication holes 80 formed in separation wall 64 of holding member 60, and flows into first flow path 70 of gas flow path 74 (the gas flow at this time is indicated by arrow A).

Since each of communication holes 80 is formed as a through hole inclined towards a squib 42 side, gas contacts an inner side surface of base wall portion 38A of lower case 38, flows through first flow path 70 towards a base portion 42B side of squib 42, contacts an outer peripheral surface of base portion 42B of squib 42, then flows (returns) through first flow path 70, and flows towards second flow path 72. By this process, the high temperature gas undergoes heat exchange with base wall portion 38A of lower case 38, and is cooled. Further, mist 82 included in the gas adheres to base wall portion 38A of lower case 38, and is thereby removed from the gas. Subsequently, gas that flows through second flow path 72 breaks seal 78 and is ejected towards the outside of inflator 24 from gas ejection hole 76 formed in peripheral wall portion 36B of upper case 36 (the gas flow at this time is indicated by arrow B).

In the above manner, the generated gas flows from inflator 24 into folded airbag 26 and expands airbag 26. When the bag expansion pressure of airbag 26 is a predetermined value or greater, protective cloth 32 breaks and breaking portion 34 formed at a back surface side of airbag door 22 breaks, and airbag door 22 opens in a forward and rear direction. As a result, airbag 26 develops towards an occupant side and may receive an upper body, including a head portion, of an occupant, that moves towards a steering wheel 10 side due to inertia.

In the present embodiment, since gas ejection hole 76 formed in upper case 36 is disposed offset in an inflator case axial direction (towards an occupant side), with respect to a inflator case axial direction central position of combustion chamber 68 (dot-dash line P in FIG. 1), and since separation wall 64 is provided having plural communication holes 80 at a side opposite a side at which a gas ejection hole of holding member 60 is provided, the length of a flow path L1 through which gas ejected from communication holes 80 flows (a distance from a starting end of gas flow path 74 to gas ejection hole 76) may be increased. Thereby, heat exchange between high temperature gas generated at combustion chamber 68, and peripheral wall portion 36B of upper case 36, and lower case 38, may be promoted, and the gas may be effectively cooled. Further, mist 82 included in the gas may adhere to an inner side surface of base wall portion 38A of lower case 38 due to a flow resistance when the gas passes through first flow path 70 of gas flow path 74. In other words, a flow path length of a gas flow path sufficient for adherence of mist 82 to an inner surface side of base wall portion 38A of lower case 38 may be ensured. Thereby, mist 82 included in the gas can be effectively removed before reaching gas ejection hole 76.

Figure 5:
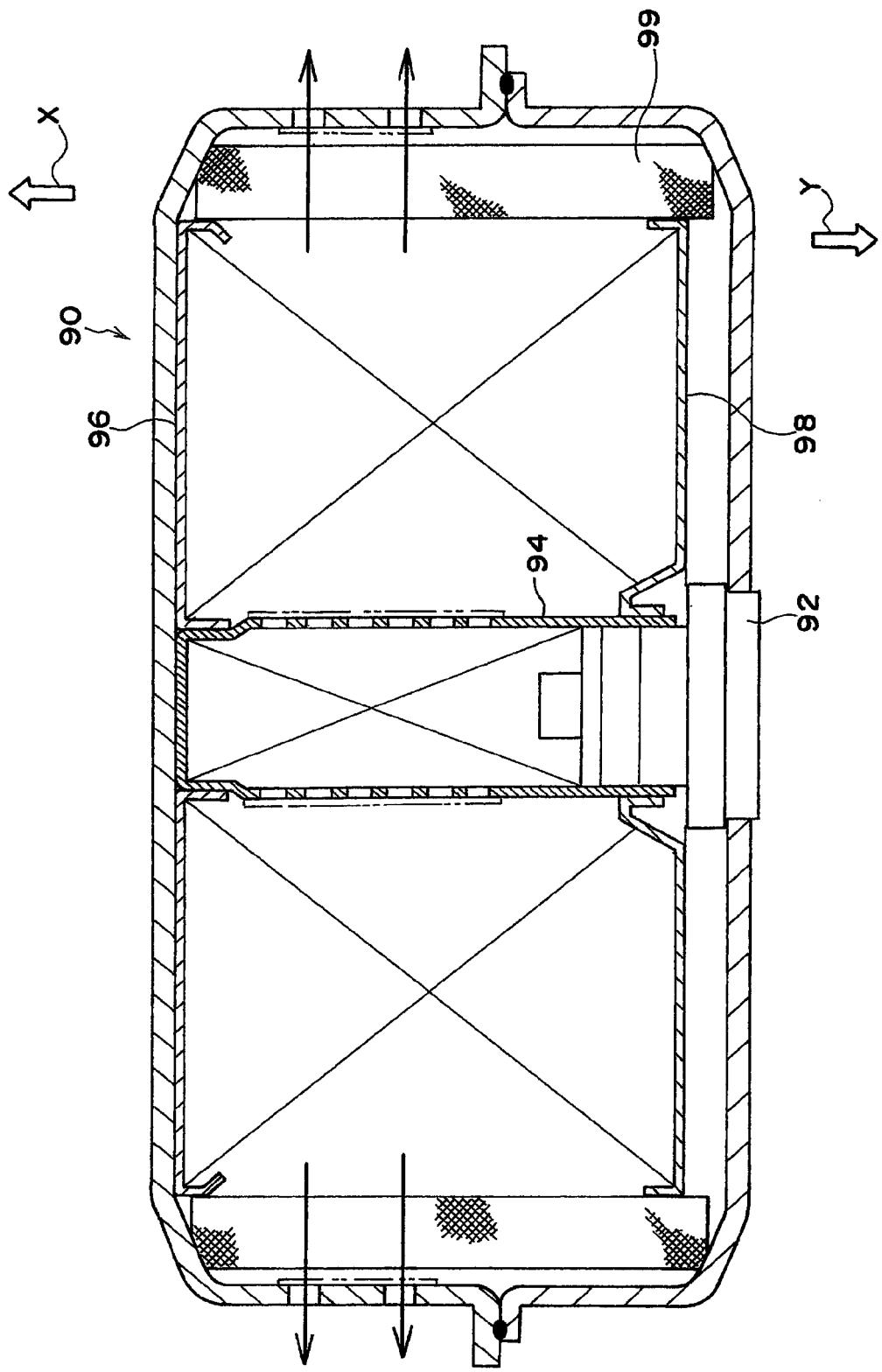
FIG. 5 is an enlarged longitudinal section of an inflator according to a comparative example used in order to explain the effects of the inflator according to the first embodiment.

According to the present embodiment, gas can be cooled and mist 82 included in the gas can be removed without the addition of new parts in particular. FIG. 5 is a longitudinal section of a general conventional disc inflator 90. As shown in this figure, conventional disc inflator 90 includes two upper and lower circular plates 96 and 98 mounted at each end portion in an axial direction of a retainer 94 mounted to a squib 92. A filter 99 is provided wrapped as a ring around an outer peripheral surface of plates 96 and 98 manner. As a result, inflator 90 has the disadvantage of being enlarged towards a radial direction outer side. In contrast, according to inflator 24 of the present embodiment, since gas flow path 74 performs the function of filter 99, filter 99 can be disposed of. Thus, with respect to a disc inflator, the present invention can ensure gas cooling and mist removal functions, while at the same time reducing the weight of the inflator and the size thereof in a radial direction.

This effect (of reducing the size and weight of the inflator) is especially advantageous with respect to driver's seat airbag device 18. That is, since driver's seat airbag device 18 is mounted in wheel pad 16 of steering wheel 10, there is little mounting space in a radial direction and in an axial direction of steering wheel 10. In this case, by using inflator 24 having the above configuration, driver's seat airbag device 18 can be made lighter and more compact.

Further, in the present invention, it is a precondition that gas ejection hole 76 is positioned offset towards an occupant side only by an amount δ with respect to a central position P of combustion chamber 68 in an axial direction of the inflator case, and that separation wall 64 is provided only at holding member 60 at a side opposite a side at which a gas ejection hole is positioned in an axial direction of the inflator case, and that a separation wall is not provided at a side in an axial direction of the inflator case at which a gas ejection hole is positioned, such that holding member 60 is in an open state upon contacting (sealing) base wall portion 36A of upper case 36. Therefore, compared to a case in which separation wall 64 is positioned at both end portions of holding member 60 in an inflator case axial direction, assuming the accommodation volume of gas generating agent 54 is not changed, the size of inflator 24 may be reduced in an axial direction by a length corresponding to the thickness of separation wall 64. Thus, inflator 24 can be reduced in size in both of a radial direction and an axial direction. Conversely, if the axial direction dimensions of inflator 24 are not changed, the accommodation volume of gas generating agent 54 can be increased. As a result, it is possible to increase a gas supply amount in inflator 24 without changing the size thereof.

Further, communication holes 80 of separation wall 64 are formed inclined in a direction away from gas ejection hole 76 (towards an axial core side of inflator 24) only by an angle θ with respect to a plate thickness direction Q that passes through communication holes 80; therefore, gas flows 76 within first flow path 70 of gas flow path 74 away from gas ejection hole, (is deflected) and flows around towards a peripheral wall portion 36B side of upper case 36. Therefore, although the flow path length of first flow path 70 itself does not change, the length of the gas flow path in practice increases. As a result, gas cooling and mist removal functions can be improved.

Second Embodiment

A second embodiment of the inflator and vehicle airbag device according to the present invention is explained below with reference to FIG. 6. Therein, structural elements identical to those of the first embodiment are given the same reference numerals and description thereof is omitted.

Figure 6:
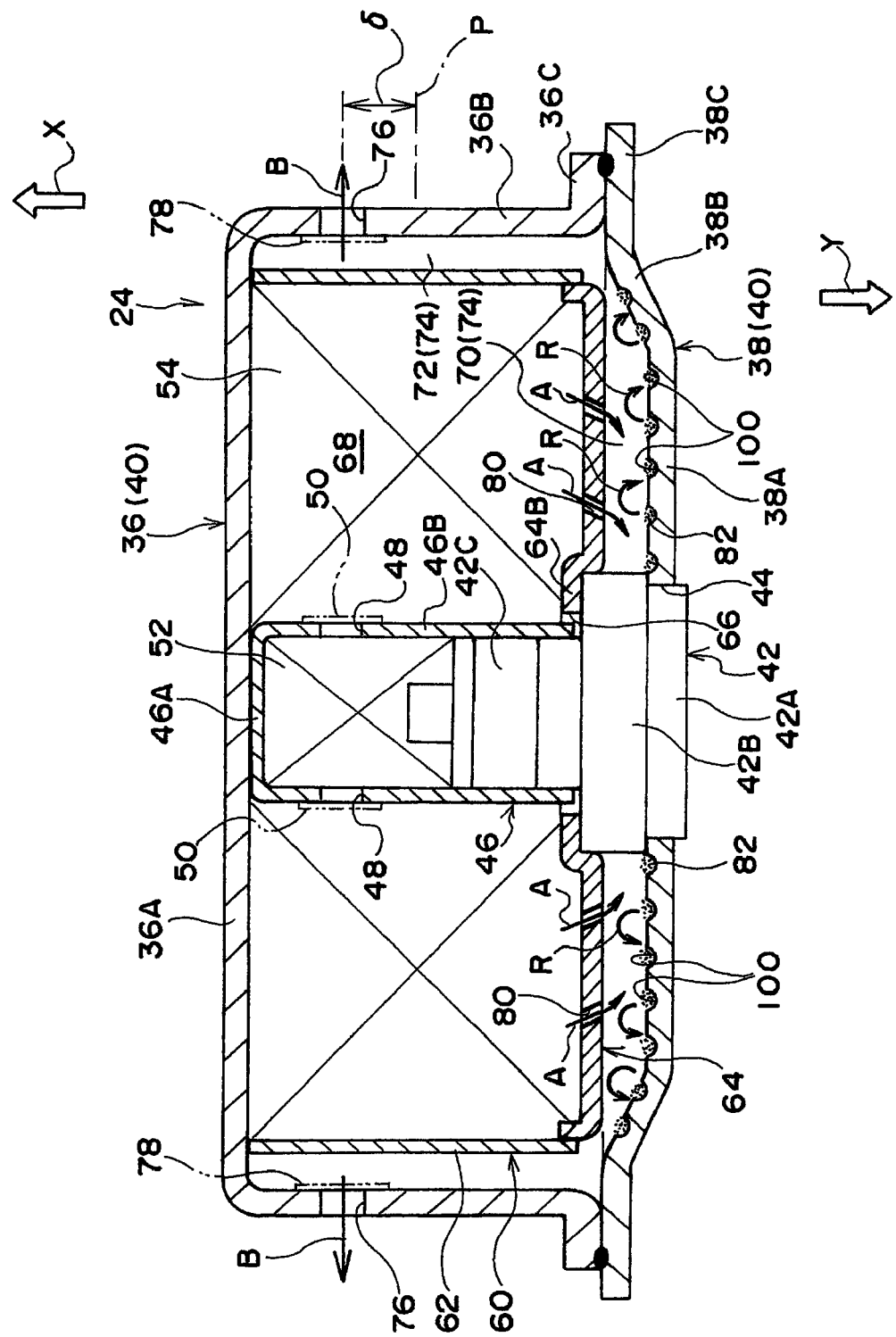
FIG. 6 is an enlarged longitudinal section corresponding to FIG. 1, showing an inflator according to the second embodiment.

As shown in FIG. 6, inflator 24 according to the second embodiment is characterized by including plural dimples 100 as recessed portions in an inner side surface of separation wall 64 of holding member 60. Plural protruding portions (bumps) may be provided instead of dimples 100, or a combination of recessed portions and protruding portions may be provided.

Operation and Effects

As a result of the above configuration, since plural dimples 100 are formed at an occupant side surface of base wall portion 38A of lower case 38, when gas flows through first flow path 70, turbulence is generated by dimples 100 (see arrow R in FIG. 6). Consequently, to the extent that the turbulence is generated, the amount of time that the gas remains at a position at which dimples 100 are formed increases, and the amount of time over which heat exchange occurs between the gas lower case 38 also increases. Further, since turbulence is generated by dimples 100, the amount of time over which the gas is resisted by base wall portion 38A of lower case 38 also increases. The generation of turbulence also increases the area over which the gas contacts base wall portion 38A of lower case 38. Due to these processes, mist 82 accumulates at the surface of dimples 100 and thereby mist 82 can be further removed. In summary, according to the present embodiment a gas can be cooled to a greater extent and also mist 82 included in the gas can be removed to a greater extent.

Third Embodiment

A third embodiment of the inflator according to the present invention, and vehicle airbag device provided with the inflator, is explained below with reference to FIGS. 7 and 8. Therein, structural elements identical to those of the first embodiment are given the same reference numerals and description thereof is omitted.

Figure 7:
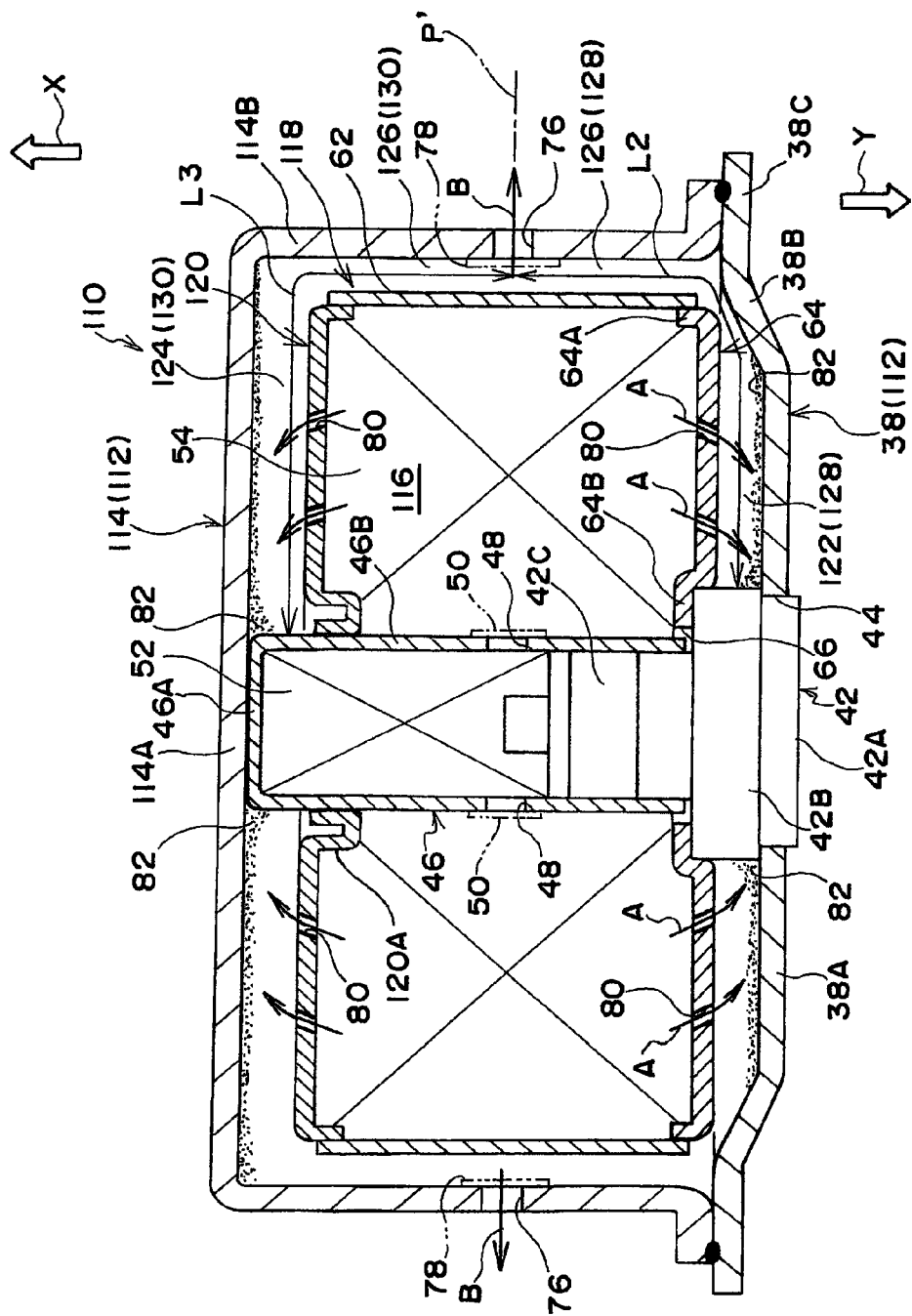
FIG. 7 is an enlarged longitudinal section corresponding to FIG. 1, showing an inflator according to the third embodiment.
Figure 8:
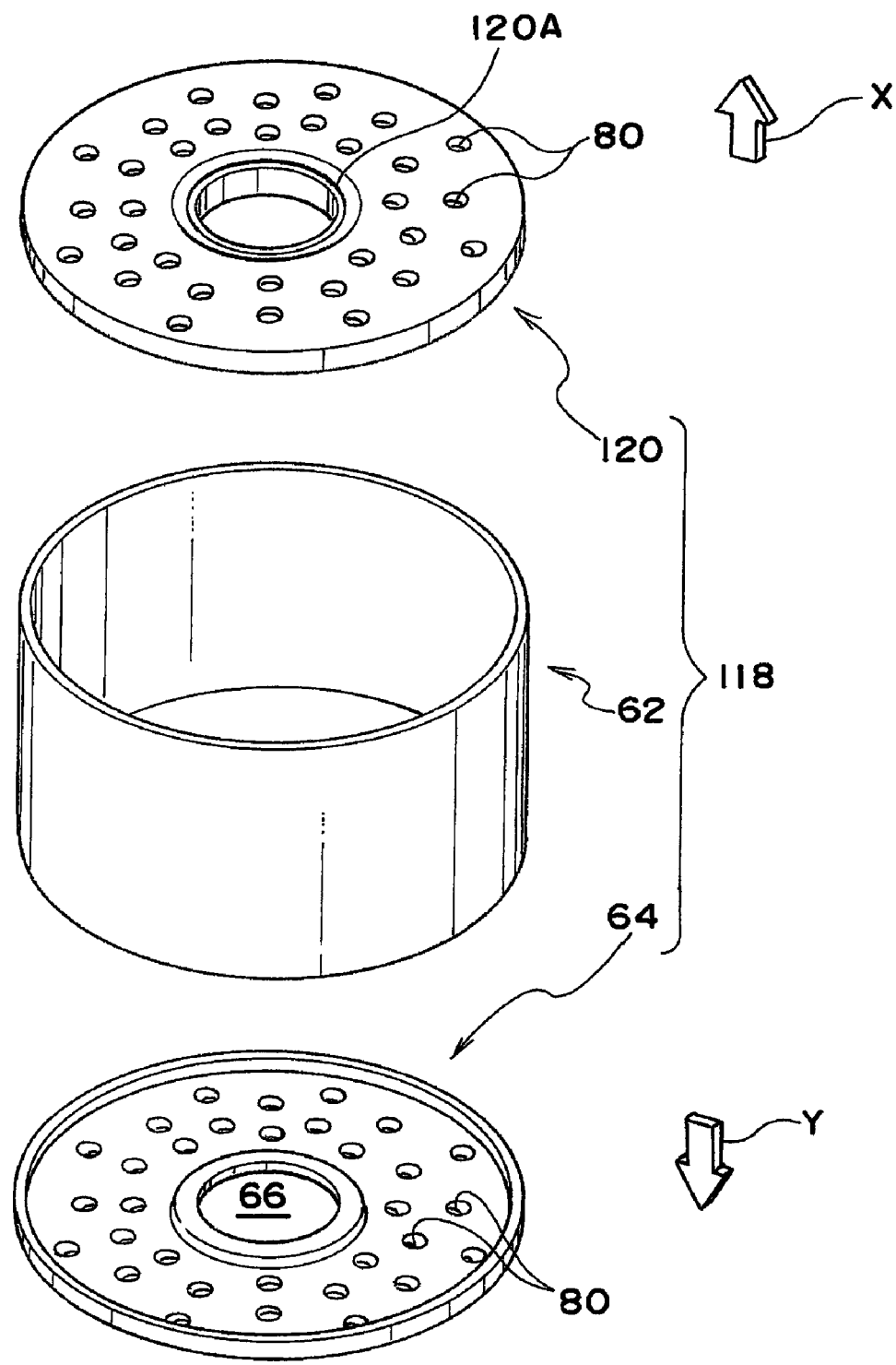
FIG. 8 is an exploded perspective view of the inflator shown in FIG. 7 (omitting a gas generating agent).

As shown in FIGS. 7 and 8, in inflator 110 of the third embodiment, lower case 38 of inflator case 112 is configured identically to that of the first embodiment, except that an upper case 114 is formed to be longer in an axial direction (please compare FIG. 1 and FIG. 7). In other words, in the third embodiment, it is assumed that a vehicle airbag device has sufficient space for mounting inflator 110 which is longer in an axial direction than inflator 24 of the first embodiment.

Since upper case 114 is longer in an axial direction, in inflator 110, gas ejection hole 76 is disposed at a central position in an axial direction of combustion chamber 116 (see dot-dash line 'P). In other words, different to the first embodiment, gas ejection hole 76 is not offset in an axial direction from a central position in an axial direction of combustion chamber 116.

Further, a holding member 118 includes cylindrical peripheral wall portion 62 having an outer diameter smaller than an inner diameter of upper case 114, a circular plate shaped separation wall 64 that seals an open end portion at a side opposite an occupant of peripheral wall portion 62, and a separation wall 120 that seals an open end portion at an occupant side of peripheral wall portion 62. Plural communication holes 80 are also formed at separation wall 120 disposed at an occupant side, in a similar manner to separation wall 64 at a side opposite an occupant. At an axial core portion of separation wall 120 is formed a mounting portion 120A, which is substantially "U" shaped in a sectional view, that contacts peripheral wall portion 46B of retainer 46.

When holding member 118 is mounted inside inflator case 112 a ring plate shaped space (a third flow path 122) is formed at between separation wall 64 disposed at a side opposite an occupant and base wall portion 38A of lower case 38, and a further a ring plate shaped space (a fourth flow path 124) is formed between separation wall 120 disposed at an occupant side and base wall portion 114A of upper case 114. Further, between peripheral wall portion 62 of holding member 118 and peripheral wall portion 114B of upper case 114 is formed a circular space (a fifth flow path 126). Third flow path 122 and fifth flow path 126 are mutually communicated, and together form a lower side gas flow path 128 (flow path length L2). Further, fourth flow path 124 and fifth flow path 126 are mutually communicated, and together form an upper gas flow path 130 (flow path length L3). Flow path length L2 of lower side gas flow path 128 and flow path length L3 of upper gas flow path 130 are substantially the same length.

Thus, in the third embodiment, separation wall 64 and separation wall 120 provided with communication holes 80 are provided at an end portion at a side opposite an occupant, and also at an end portion at an occupant side, and lower side gas flow path 128 and upper gas flow path 130 corresponding to separation wall 64 and separation wall 120, respectively, are also formed. However, flow path lengths L2 and L3 of lower side gas flow path 128 and upper gas flow path 130 are respectively shorter than flow path length L1 of gas flow path 74 of the first embodiment.

Operation and Effects

According to the above configuration, when an electrical current is sent to squib 42, gas generating agent 52 in retainer 46 combusts, a flame spreads to the inside of combustion chamber 116 via communication holes 48 of retainer 46, gas generating agent 54 accommodated in combustion chamber 116 combusts and a large amount of gas is generated.

Approximately half of this gas flows through communication holes 80 of separation wall 64 at a side opposite an occupant, and into third flow path 122, and subsequently flows through fifth flow path 126 and is ejected out of inflator 110 from gas ejection hole 76. The remaining half of the gas flows through communication holes 80 of separation wall 120 provided at an occupant side, and into fourth flow path 124, and subsequently through fifth flow path 126 and is ejected out of inflator 110 from gas ejection hole 76. Due to this process, according to a similar principle as that of the first embodiment described above, gas undergoes heat exchange with lower case 38 and upper case 114 and is cooled thereby, and mist 82 included in the gas adheres to base wall portion 38A and base wall portion 114A of upper case 114 and is removed thereby.

In other words, in the third embodiment, a system of two gas flow paths equal in length (lower side gas flow path 128 and upper gas flow path 130) are formed from respective flow path starting ends to gas ejection hole 76. As a result, although compared with the first embodiment, in which gas ejection hole 76 is offset, the flow path length therefore appears to be shorter when only considering flow path lengths L2 and L3 of lower side gas flow path 128 and upper gas flow path 130, respectively, in the present embodiment, in which an inflator case of combustion chamber 116 is comparatively larger in an axial direction, a system of two gas flow paths (lower side gas flow path 128 and upper gas flow path 130) is provided in which each gas flow path has an effective gas cooling surface and mist removal surface, and thereby heat exchange at combustion chamber 116 between a high temperature gas and inflator case 112 is promoted, and the gas may be effectively cooled. Further, mist 82 included in the gas passes through lower side gas flow path 128 and upper gas flow path 130 and flow thereof is resisted thereby, and thereby mist adheres to inner side surfaces of base wall portion 38A of lower case 38 and base wall portion 114A of upper case 114. In other words, it is possible to ensure a flow path length sufficient for causing mist 82 to adhere to base wall portion 38A of lower case 38 and base wall portion 114A of upper case 114, in each gas flow path. Therefore, mist 82 included in the gas can be effectively removed due to the system of two flow paths (lower side gas flow path 128 and upper gas flow path 130) before it reaches gas ejection hole 76 from communication holes 80.

As described above, according to the present embodiment, gas cooling and mist removal can be performed without the particular addition of new parts. That is, it becomes possible for other parts to perform the function of filter 99 wrapped in a ring as used in the prior art (see FIG. 5), and as a result, in a disc inflator, gas cooling and mist removal functions can be obtained, and it is possible to reduce the size of the disc inflator in a radial direction, and also to reduce the weight thereof.

Supplemental Explanation of the Embodiments

In the above-described embodiments, an inflator according to the present invention was used with driver's seat airbag device 18; however, the present invention is not limited to this, and the inflator according to the present invention may be used with other vehicle airbag devices such as a passenger seat airbag device.

Further, in the above embodiment, explanation is given of inflator 24 and inflator 110 operating in a frontal impact; however, the present invention is not limited to this, and the inflator or a vehicle airbag device provided with the inflator of the present invention may be used for a system in which a impact prediction means such as a pre-crash sensor is mounted. In this case, the inflator operates when a frontal impact is predicted.

Moreover, in the above embodiment, it is described that communication holes 80 of separation wall 64 and separation wall 120 are formed to be inclined towards an axial line side of inflator 24 and inflator 110; however, the present invention is not limited to this, and communication holes 80 may pass through in a plate thickness direction (in the direction of dot-dash line Q of FIG. 1).

In the first and second embodiments, separation wall 64 having communication holes 80 formed is provided only at an open end portion side of a side opposite an occupant of holding member 60; however, the present invention is not limited to this, and communication holes may also be formed at an open end portion side of an occupant side of holding member 60. That is, in a holding member, a separation wall having communication holes formed therein may be disposed at least at a side opposite a side at which a gas ejection hole is disposed. However, if gas ejection hole 76 is formed offset in an inflator case axial direction towards an occupant side with respect to a central position of combustion chamber 68, forming a separation wall at an occupant side will reduce the length of a gas flow path, and a gas cooling function and a mist removal function will be reduced compared to when a gas flow path is formed at a side opposite an occupant.

In the above embodiment, holding member 60 and holding member 118 include two members or three members; however, they may be integrally formed. Moreover, in the first embodiment and the second embodiment, combustion chamber 68 is defined by the three elements holding member 60, base wall portion 36A of upper case 36, and peripheral wall portion 46B of retainer 46; and in the third embodiment, combustion chamber 116 is defined by the two elements holding member 118 and peripheral wall portion 46B of retainer 46; however, the present invention is not limited to this, and a combustion chamber may be defined only by a holding member. For example, in the case of the first embodiment, retainer 46 may be integrated with an axial core portion of holding member 60, and a separation wall, in which communication holes are not formed, may serve as a cover for an open end portion at an occupant side of peripheral wall portion 62. Similarly, in the case of the third embodiment, retainer 46 may be integrated with separation wall 64 of holding member 118, and separation wall 120, in which communication holes are not formed, may cover and fit at an open end portion at an occupant side of holding member 118.

Figure 9A:
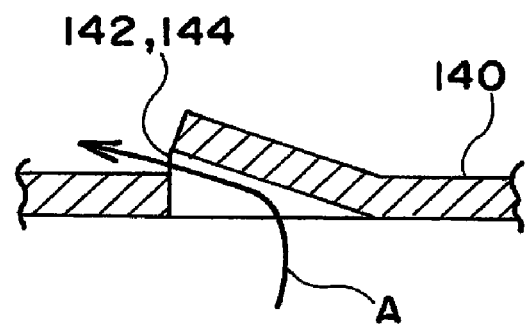
FIG. 9A relates to a variation of a separation wall having a communication hole shown in FIG. 1, and is a longitudinal section of the separation wall at a position where a communication hole is formed.
Figure 9B:
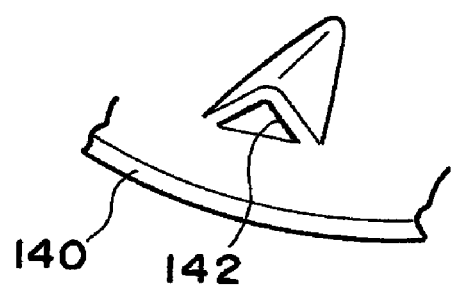
FIG. 9B is a perspective view of a communication hole according to a first variation.
Figure 9C:
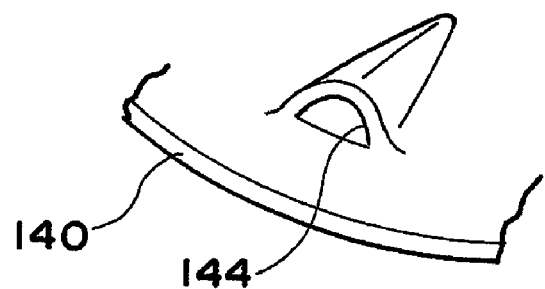
FIG. 9C is a perspective view of a communication hole according to a second variation.

In the above embodiment, for example, in the first embodiment, in order to deflect the flow of gas, communication holes 80 are formed in peripheral edge portion 64A of separation wall 64 such that they are inclined away from gas ejection hole 76 only by an angle θ with respect to a plate thickness direction Q; however, with this configuration, separation wall 64 must have a certain thickness. Accordingly, as shown in FIGS. 9A to 9C, communication holes 142 and 144 may be formed in separation wall 140 by a press forming process (a punching process). FIGS. 9A to 9C show separation wall 140 upside down.

In the example configuration shown in FIG. 9B, a predetermined location in separation wall 140 is punched out to form approximately a triangular pyramid such that the shape of an ejection opening of communication hole 142 is approximately an isosceles triangle. A section taken through the center thereof exhibits a punched out shape, as shown in FIG. 9A. In the example configuration shown in FIG. 9C, a predetermined location in separation wall 140 is punched out to form a approximately conical shape such that the shape of an ejection opening of communication hole 144 is approximately a semicircle. A section taken through the center thereof also exhibits a punched out shape as shown in FIG. 9A. By using communication holes 142 and 144, favorable directionality that deflects the direction in which gas flows can be obtained.

What is claimed is:

1. An inflator comprising:
   an inflator case including a pair of base wall portions that close end portions in an axial direction of a peripheral wall portion in which a gas ejection hole is formed;
   an ignition device disposed at an inner portion of the inflator case;
   a holding member disposed at the inner portion of the inflator case, that accommodates and holds a gas generating agent that generates gas as a result of being ignited by the ignition device and combusting; and
   a gas flow path, that promotes heat exchange between high temperature gas generated at a combustion chamber and the inflator case, formed at an inner side of the inflator case and at a periphery of the holding member, such that the combustion chamber defined by at least the holding member is communicated with the gas ejection hole, wherein
   the gas ejection hole is offset in an axial direction of the inflator case, with respect to a central position of the combustion chamber in the axial direction of the inflator case,
   a separation wall that forms a part of the holding member and that is provided with a communication hole that communicates the combustion chamber with the gas flow path, is disposed at least at a side opposite a side of the holding member in an inflator case axial direction at which the gas ejection hole is disposed, such that the inflator does not use a filter, and
   the communication hole is formed inclined away from the gas ejection hole with respect to a plate thickness direction that passes through the communication hole.

2. The inflator of claim 1, wherein:
   the separation wall is disposed at a side of the holding member opposite a side in the inflator case axial direction at which the gas ejection hole is formed, and
   the separation wall is not disposed at a side of the holding member in the axial direction of the inflator case at which the gas ejection hole is formed, said side being in an open state, and being closed by a base wall portion of the inflator case.

3. The inflator of claim 1, wherein the communication hole is formed by punching out the separation wall in a substantially triangular pyramid shape or a substantially conical shape such that an ejection opening of the communication hole is a substantially triangular shape or a substantially semicircular shape.

4. The inflator of claim 1, wherein at an inner side surface of a base wall portion that opposes the separation wall of the inflator case, plural projections, or plural recessions, or both plural recessions and plural projections, are formed, in order to generate turbulence in a gas flow.

5. A vehicle airbag device comprising:
   the inflator of claim 1;
   a base member that is attached to and supports the inflator;
   an airbag fixed to the base member in a folded state, and that expands upon being supplied with gas from the inflator; and
   an airbag cover that stores the airbag in a folded state between the airbag cover and the base member, and that opens an airbag door and expands the airbag when a bag expansion pressure reaches a predetermined value.

6. The vehicle airbag device of claim 5, wherein the airbag device is for a driver's seat.

7. An inflator comprising:
   an inflator case including a pair of base wall portions that close end portions in an axial direction of a peripheral wall portion in which a gas ejection hole is formed;
   an ignition device disposed at an inner portion of the inflator case;
   a holding member disposed at the inner portion of the inflator case, that accommodates and holds a gas generating agent that generates gas as a result of being ignited by the ignition device and combusting; and
   a gas flow path, that promotes heat exchange between high temperature gas generated at a combustion chamber and the inflator case, formed at an inner side of the inflator case and at a periphery of the holding member, such that the combustion chamber defined by at least the holding member is communicated with the gas ejection hole, wherein
   the gas ejection hole is disposed in the combustion chamber at a central position in an axial direction of the inflator case; and
   at both end portions of the holding member in the axial direction of the inflator case, respective separation walls that form part of the holding member are formed each provided with a communication hole that communicates the combustion chamber with the gas flow path, such that the inflator does not use a filter.

8. The inflator of claim 7, wherein each communication holes is formed inclined away from the gas ejection hole with respect to a plate thickness direction that passes through the communication hole.

9. The inflator of claim 7, wherein each communication hole is formed by punching out the separation wall in a substantially triangular pyramid shape or a substantially conical shape such that an ejection opening of the communication hole is a substantially triangular shape or a substantially semicircular shape.

10. The inflator of claim 7, wherein at an inner side surface of a base wall portion that opposes the separation wall of the inflator case, plural projections, or plural recessions, or both plural recessions and plural projections, are formed, in order to generate turbulence in a gas flow.

11. A vehicle airbag device comprising:
    the inflator of claim 7;
    a base member that is attached to and supports the inflator;
    an airbag fixed to the base member in a folded state, and that expands upon being supplied with gas from the inflator; and
    an airbag cover that stores the airbag in a folded state between the airbag cover and the base member, and that opens an airbag door and expands the airbag when a bag expansion pressure reaches a predetermined value.

12. The vehicle airbag device of claim 11, wherein the airbag device is for a driver's seat.

* * * * *